(12) United States Patent
Hosek

(10) Patent No.: US 9,037,297 B2
(45) Date of Patent: May 19, 2015

(54) SYSTEM AND METHOD FOR OPERATION OF A ROBOT

(75) Inventor: Martin Hosek, Lowell, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 276 days.

(21) Appl. No.: 13/614,133

(22) Filed: Sep. 13, 2012

(65) Prior Publication Data

US 2013/0073092 A1 Mar. 21, 2013

Related U.S. Application Data

(60) Provisional application No. 61/627,067, filed on Sep. 15, 2011.

(51) Int. Cl.
| | |
|---|---|
| *G02B 27/01* | (2006.01) |
| *G06T 19/00* | (2011.01) |
| *G09G 5/00* | (2006.01) |
| *G06K 9/00* | (2006.01) |
| *G06F 3/0488* | (2013.01) |
| *B25J 13/00* | (2006.01) |
| *G06F 3/038* | (2013.01) |
| *G06F 3/0346* | (2013.01) |

(52) U.S. Cl.
CPC .............. *G06F 3/0488* (2013.01); *B25J 13/00* (2013.01); *G02B 27/017* (2013.01); *G02B 2027/0178* (2013.01); *G02B 2027/0138* (2013.01); *G02B 2027/0187* (2013.01); *G06F 3/038* (2013.01); *G06F 2203/0381* (2013.01); *G06F 3/0346* (2013.01)

(58) Field of Classification Search
USPC .......... 359/630, 13, 28; 345/156, 633, 8, 173; 310/156.32, 156.33; 700/264; 455/566
See application file for complete search history.

(56) References Cited

U.S. PATENT DOCUMENTS

| | | | | |
|---|---|---|---|---|
| 6,766,036 | B1 * | 7/2004 | Pryor | 382/103 |
| 6,805,677 | B2 * | 10/2004 | Simmons | 600/595 |
| 8,108,092 | B2 * | 1/2012 | Phillips et al. | 701/23 |
| 8,326,469 | B2 * | 12/2012 | Phillips et al. | 701/2 |
| 2004/0189631 | A1 | 9/2004 | Kazi et al. | |
| 2004/0248619 | A1 * | 12/2004 | Graiger et al. | 455/566 |
| 2010/0181332 | A1 * | 7/2010 | Wang et al. | 221/1 |
| 2010/0182136 | A1 * | 7/2010 | Pryor | 340/425.5 |
| 2011/0037712 | A1 | 2/2011 | Kim et al. | |
| 2011/0106339 | A1 * | 5/2011 | Phillips et al. | 701/2 |
| 2012/0069131 | A1 * | 3/2012 | Abelow | 348/14.01 |
| 2012/0075168 | A1 * | 3/2012 | Osterhout et al. | 345/8 |
| 2013/0050069 | A1 * | 2/2013 | Ota | 345/156 |
| 2014/0333666 | A1 * | 11/2014 | Poulos et al. | 345/633 |

OTHER PUBLICATIONS

Written Opinion of the International Searching Authority for International Application No. PCT/US2012/000396, Nov. 20, 2012, 4 pgs. (unnumbered).

* cited by examiner

*Primary Examiner* — Ronnie Mancho
(74) *Attorney, Agent, or Firm* — Iandiorio Teska & Coleman, LLP

(57) ABSTRACT

A system for operation of a robot including a substantially transparent display configured such that an operator can see a portion of the robot and data and/or graphical information associated with the operation of a robot. Preferably, a controller in communication with the robot and the transparent display is configured to allow the operator to control the operation of the robot.

22 Claims, 6 Drawing Sheets

SYSTEM AND METHOD FOR OPERATION OF A ROBOT

RELATED APPLICATIONS

This application claims benefit of and priority to U.S. Provisional Application Ser. No. 61/627,067 filed Sep. 15, 2011 under 35 U.S.C. §§119, 120, 363, 365, and 37 C.F.R. §1.55 and §1.78 incorporated herein by this reference.

FIELD OF THE INVENTION

This invention relates to a system and method for operation of a robot.

BACKGROUND OF THE INVENTION

Robots, such as robotic manipulators, and the like, often employed in many industrial, laboratory and other applications, typically need to undergo a set-up process, e.g., to learn locations where they will be performing certain operations, such as picking and/or placing material. In the set-up process, robotic manipulators may be operated manually by a human operator, typically using a hand-held command and display module. The operator often closely interacts with the robotic manipulator, e.g., to hand-locate the arm or end-effector while monitoring various data and/or graphical information displayed on the hand-held module and using buttons on the hand-held module to issue commands and enter/validate data. Such a design may result in the operator losing focus on his/her interaction with the robot.

SUMMARY OF THE INVENTION

In one aspect, a system for operation of a robot is featured. The system includes a substantially transparent display configured such that an operator can see a portion of the robot and data and/or graphical information associated with the operation of a robot. Preferably, a controller in communication with the robot and the transparent display is configured to allow the operator to control the operation of the robot.

In one embodiment, the transparent display may be located between the robot and the operator. The substantially transparent display may include a touch screen. The touch screen may be configured with a control area for entering one or more commands to control the operation of the robot. The transparent display may be configured as a wearable device. The wearable device may include one or more of glasses, goggles and/or contact lenses. The wearable device may include a control/communications module in communication with the controller. The controller may be configured to display the data and/or graphical information in the transparent display such that the data and/or graphical information appears projected in a distance. The controller may include an interface having one or more controls configured to allow the user to enter one or more commands to control the operation of the robot. The system may include a hand-held device in communication with the controller configured to allow the user to enter one or more commands to control the operation of the robot. The system may include at least one camera proximate the transparent display configured to detect which portion of the transparent display the operator is looking at. The system may include at least one camera configured to view the operation of the robot. The system may include at least one camera coupled to the wearable device configured to detect which portion of the transparent display the operation is looking at. The transparent display may be configured to allow the operator to visually select displayed the data and/or graphical information. The transparent display may be configured to allow the operator to visually select one or more commands to control the operation of the robot.

In another aspect, a system for operation of a robot is featured. The system includes a substantially transparent display located between an operator and a robot. The transparent display is configured such that the operator sees a portion of the robot and data and/or graphical information associated with the operation of a robot.

In another aspect, a method for controlling the operation of a robot is featured. The method includes viewing a portion of a robot through a substantially transparent display, displaying data and/or graphical information associated with the operation of a robot on the substantially transparent display, and controlling the operation of a robot while viewing the data and/or graphical information.

In one embodiment, the method may include entering one or more commands to control the operation of the robot on the transparent display. The method may include providing a wearable device having the substantially transparent display and visually selecting the data and/or graphical information and/or the one or more commands from the visual control area to control the operation of the robot. The method may include detecting which portion of the transparent display an operator is looking at.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
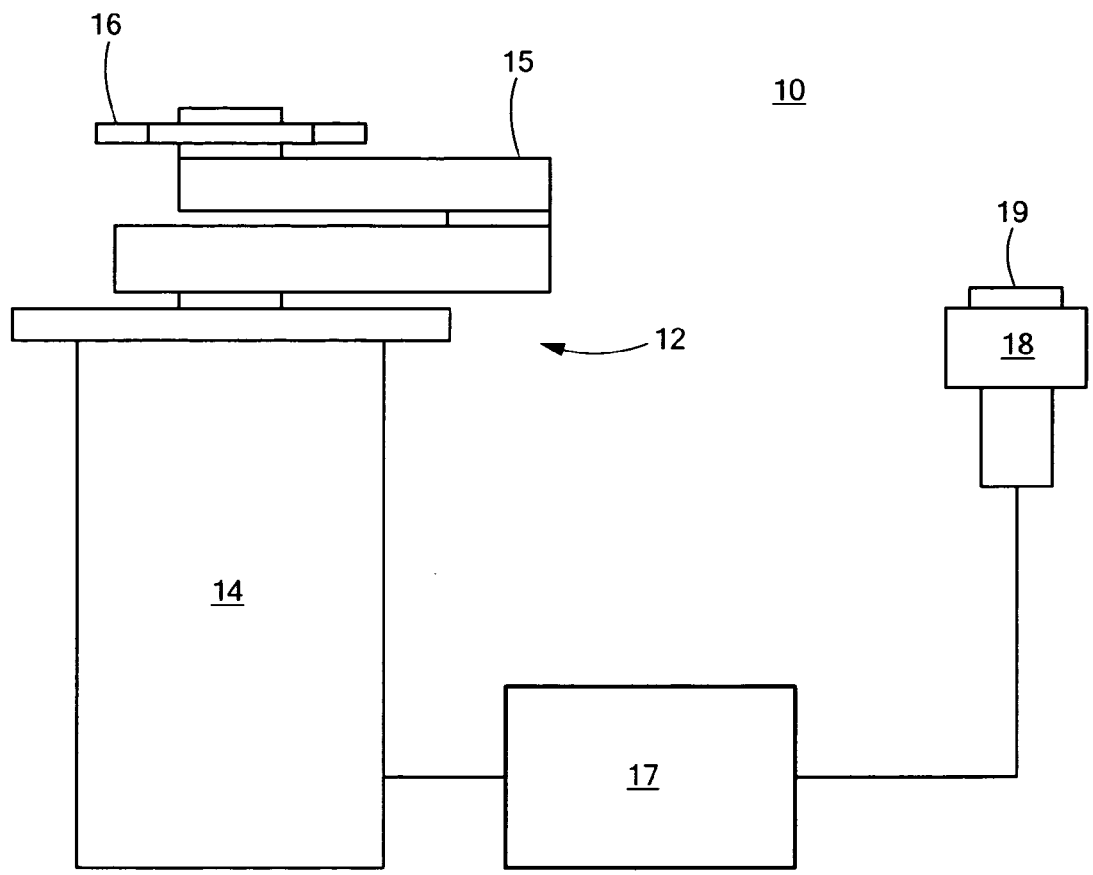
FIG. 1 is a schematic block diagram of a typical conventional robotic system for operation of a robot.

Aside from the disclosed embodiment or embodiments below, the disclosed embodiment or embodiments are capable of other embodiments and of being practiced or being carried out in various ways. Thus, it is to be understood that the disclosed embodiment or embodiments are not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

One conventional system 10, FIG. 1, for operation of a robot may include robotic manipulator 12 with robot drive unit 14, robot arm 15, robot end-effector 16, robot controller 17, and hand-held command/display module 18. System 10 is typically operated manually by human operator using hand-held robotic command/display module 18. The operator typically closely interacts with robotic manipulator 12 using controls 19 on hand-held robotic command/display module 18, e.g., to hand locate robot arm 15 and end-effector 16 while monitoring various data and graphical information on command/display module 18. However, such a design requires the operator to change his or her focus from the operation of robotic manipulator 12 to command/display module 18 while viewing the data and graphical information displayed thereon and while entering commands. Thus, the operator may lose focus and attention to the operation of robotic manipulator 12.

In contrast, system 20, FIG. 1, and the method thereof, for operation of a robot, includes essentially transparent display 22 through which operator 24 sees at least a portion of robot 26 and data and/or graphical information 28 associated with operation of robot 26. The data and/or graphical information 28 associated with the operation of robot 26 may be equivalent to that displayed on typical conventional command and display unit, e.g., the current coordinates of robot 26, fixed or selectable set points and variables, configuration data, such as data associated with arm, drive, end effector other suitable configuration(s), teach coordinates or variables, teach locations, calibration, workspace related data, trajectory related data, payload related data, robot performance related data, related graphical information such as projected tracking or move and workspace, projected or setpoints associated interference or workspace, alarms, warnings, errors, performance or similarly related data and graphical information, and operations such as initializing or homing the robot. System 10 also may include controller 30 in communication with robot 26 and transparent display 22 which allows operator 24 to control the operation of robot 26. Controlling the operation of the robot may include viewing, moving, displaying, teaching, configuring, reading, writing or entering data, operating, any suitable operation or equivalent controlling functions known to those skilled in the art. Essentially, transported display 22 may have touch screen features including numerical, text or character keyboard or layered menus, safety features, such as emergency stop and/or live man or dead man switches, drive enabling or disabling features or motors, speed variations may be controlled, forward and reverse motion control, teaching using defined locations, auto teaching or hand teaching, complete or partial motion testing, gripping and or un-gripping payloads, reading sensors states or testing, error history and logs interfacing, command history and logs interface, navigation interface such as 4 directions and a cursor, backlight, additional or integrated buttons and interfaces, separate keyboard or safety switches. The result is system 20 allows operator 24 to keep his/her focus on the operation of robot 26 while viewing the data and/or graphical information 28.

Transparent display 22 may be located between robot 20 and operator 24. Transparent display 22 may be enclosed in housing 29 as shown, or may be removed and operate independent of housing 29.

In one example, transparent display 22 may be configured as a transparent touch screen which displays data and/or graphical information 28. In this example, transparent display 22 may also include command control area 38 which allows operator 24 to enter commands to control the operation of robot 26 by touch. In other examples, controller 30 may include interface 31 having a keyboard, a touchpad, or similar type device, to allow operator 24 to control the operation of robot 26. In another design, system 20 may include hand-held device 50, having a keyboard, a touchpad, or similar type device (not shown) in communication with controller 30 to allow operator 24 to enter one or more commands to control the operation of robot 26. For safety reasons, transparent display 22 may be configured a protection shield, e.g., as shown.

Figure 3:
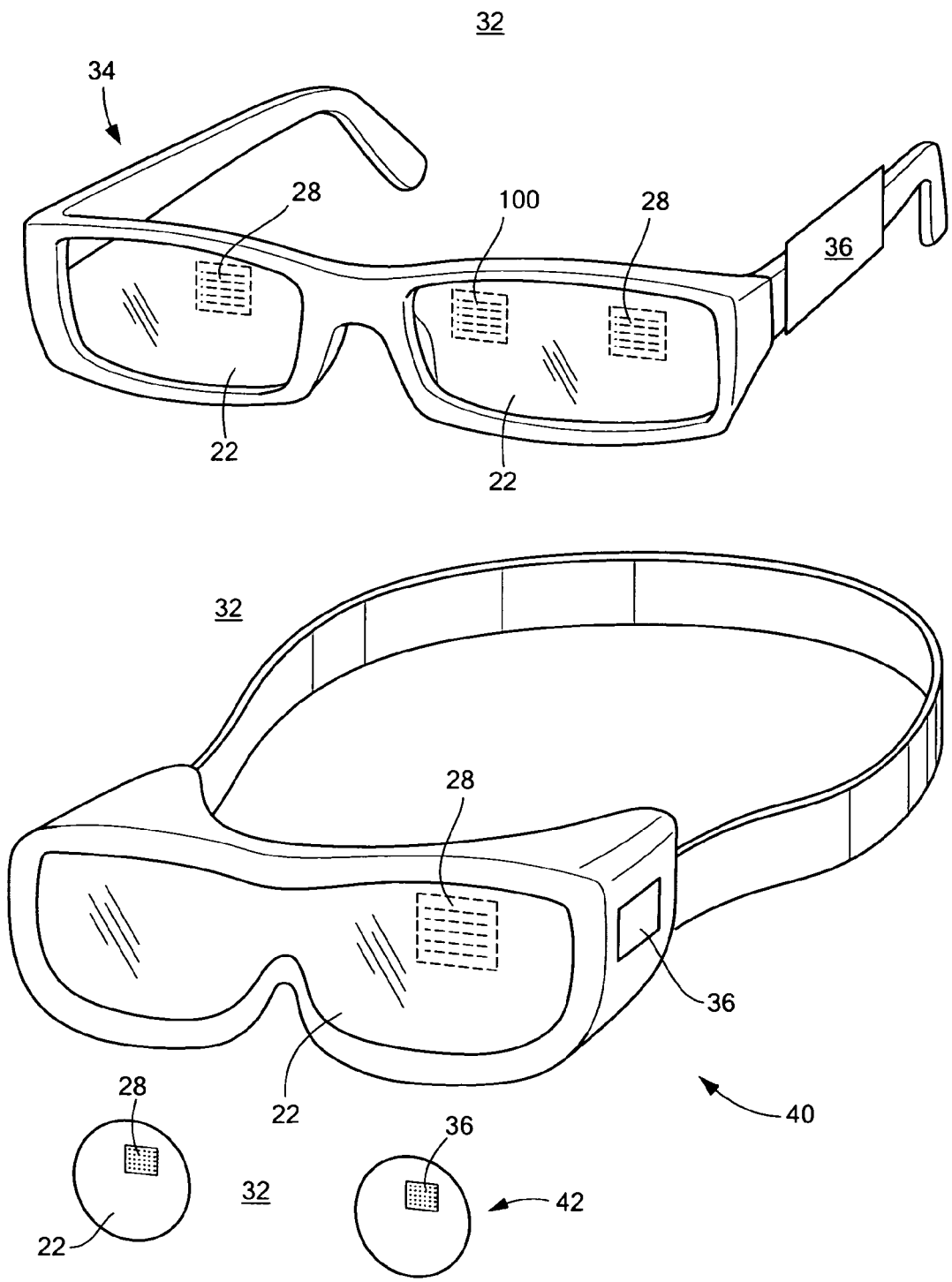
FIG. 3 is a three-dimensional view showing examples of wearable devices incorporating a substantially transparent display in accordance with the disclosed embodiment.

Substantially transparent display 22 may be configured as a wearable device, e.g. wearable device 32, FIG. 3. In one example, wearable device 32 may include glasses 34 which enclose one or more transparent displays 22 as shown. In other examples, wearable device 32 may include goggles 40 enclosing transparent display 22. Goggles 40 may be used for safety reasons. Wearable device 32 may also be configured as contact lenses 42, where one or more of contact lenses 42 are made of transparent display 22. Wearable device 32 also may include control/communication module 36 which may communicate with controller 62, FIGS. 4 and 5, such that transparent display 22, FIG. 3, displays data and/or graphical information 28, thereon, while the operator is viewing a robot, e.g., robot or robotic manipulator 54, FIGS. 4 and 5.

Figure 4:
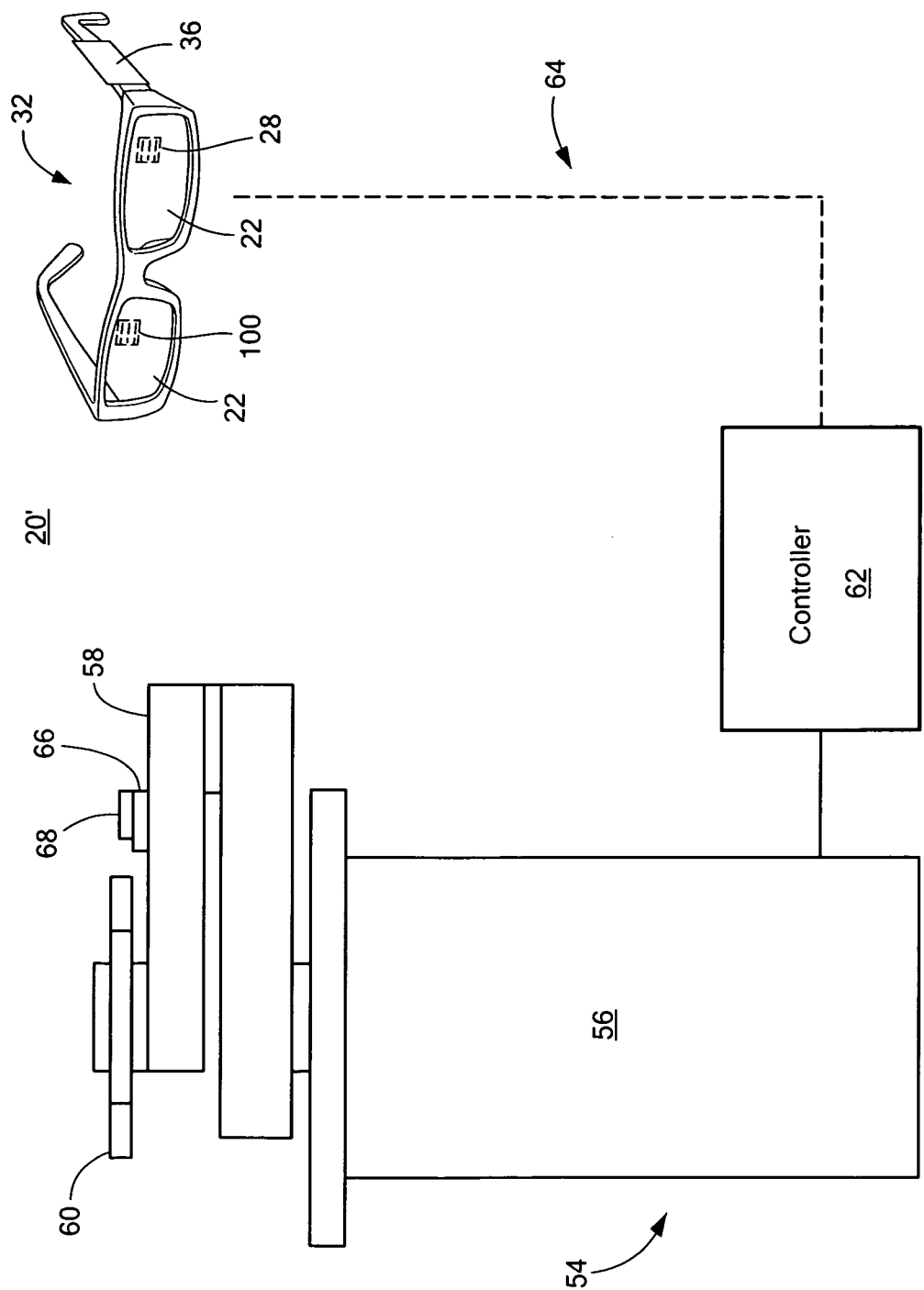
FIG. 4 is a schematic block diagram of one embodiment of the system for operation of a robot incorporating the wearable device shown in FIG. 3.

In one example, system 20', FIG. 4, where like parts have been given like numbers, may include robot 54, e.g., a robotic manipulator as shown, having robot drive unit 56, robot arm 58, and end-effector 60, or similar type device. System 20 also may include controller 62 coupled to robot 54. System 20' also includes wearable device 32 in communication with controller 62 and configured to display data and/or graphical information 28 on transparent display(s) 20 while the operator is viewing robot 54. Wearable device 32 may communicate with controller 62 via controller communications module 36 and communication channel 64, e.g., a wireless network, a cable, or similarly type communication channel. The result is system 20', FIGS. 4 and 5, allows an operator to wear wearable device 32, view data and/or graphical information 28, and keep his or her focus on the operation of robot 54.

In one example, system 20', FIG. 4, may include control interface 66 having controls 68, e.g., a keyboard, a touchpad, or similar type device, that allows the operator to enter one or more commands to control the operation of robot 54. In one design, control interface 66 may be used to activate and deactivate the servos of the robot 54 for hand-locate purposes, operate a gripper on end-effector 60 and/or confirm/store coordinates of a location, such a station where material will pick picked from and/or placed to by the robotic manipulator, or similar type operations. Control interface 66 may be located on robot arm 58 as shown, on end-effector 60, or any other suitable location on robot 54.

Figure 2:
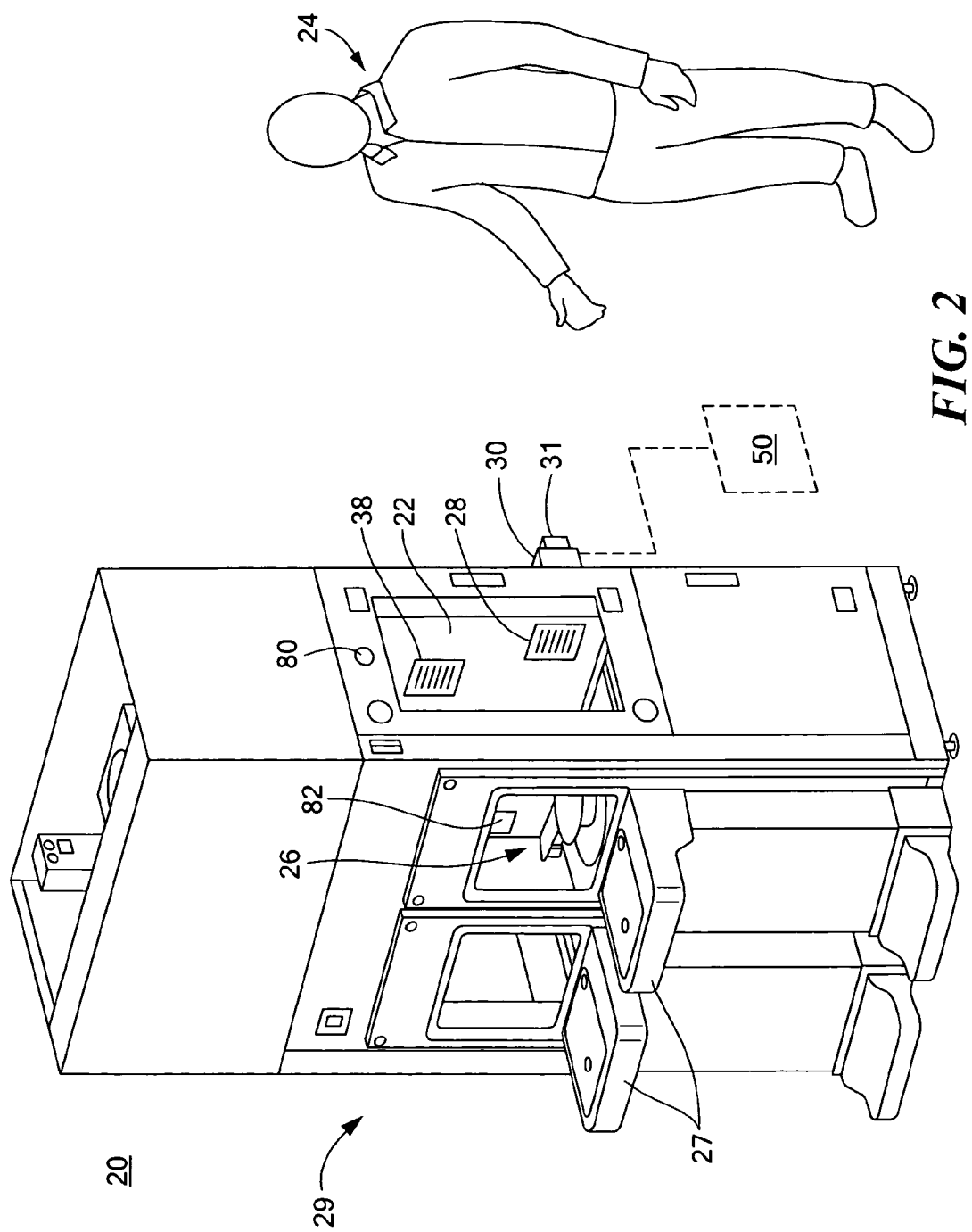
FIG. 2 is a three-dimensional view of one embodiment of the system for operation of a robot in accordance with the disclosed embodiment.

Substantially transparent display 22, FIGS. 2 and 3, may be located in the field of view of the operator. In one design, data and/or graphical information 28 is shown on the transparent display 22 such that data and/or graphical information 28 appears projected at a distance. This may correspond to a typical distance between the operator and the robot and may eliminate the need for the operator to refocus when looking at the robot and at the data or graphical information 28 on transparent display 22.

System 20, FIG. 2, may include at least one camera 80 coupled to transparent display 22 configured to track where operator 24 is looking, e.g., at a portion of transparent display 22, robot 26, load port 27, or any other location. System 20 may also include camera 82 located inside housing 29 which may tracks robot 26, the payload, or other automation.

Figure 5:
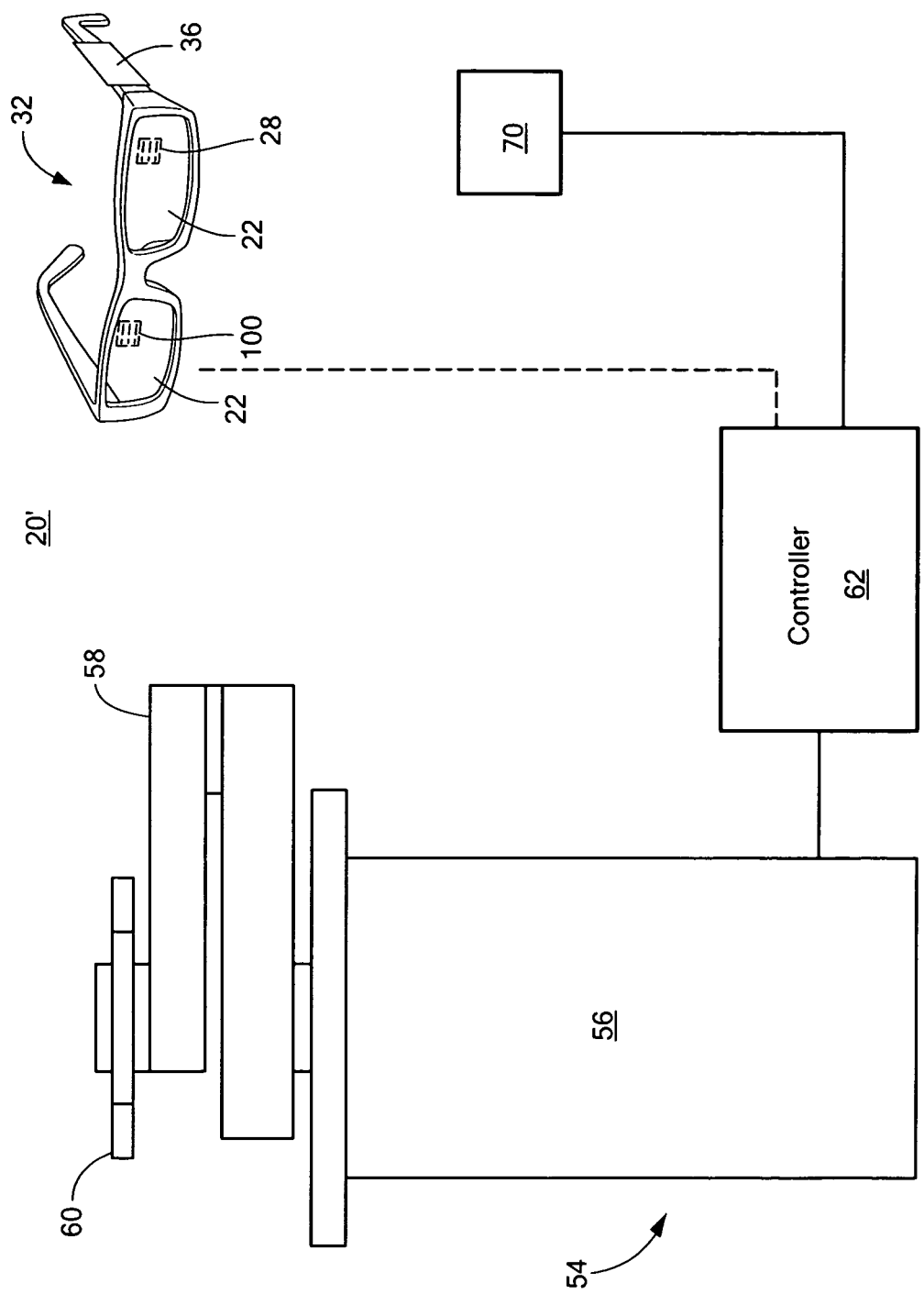
FIG. 5 is a schematic block diagram of another embodiment of the system for operation of a robot incorporating the wearable device shown in FIG. 3.
Figure 6:
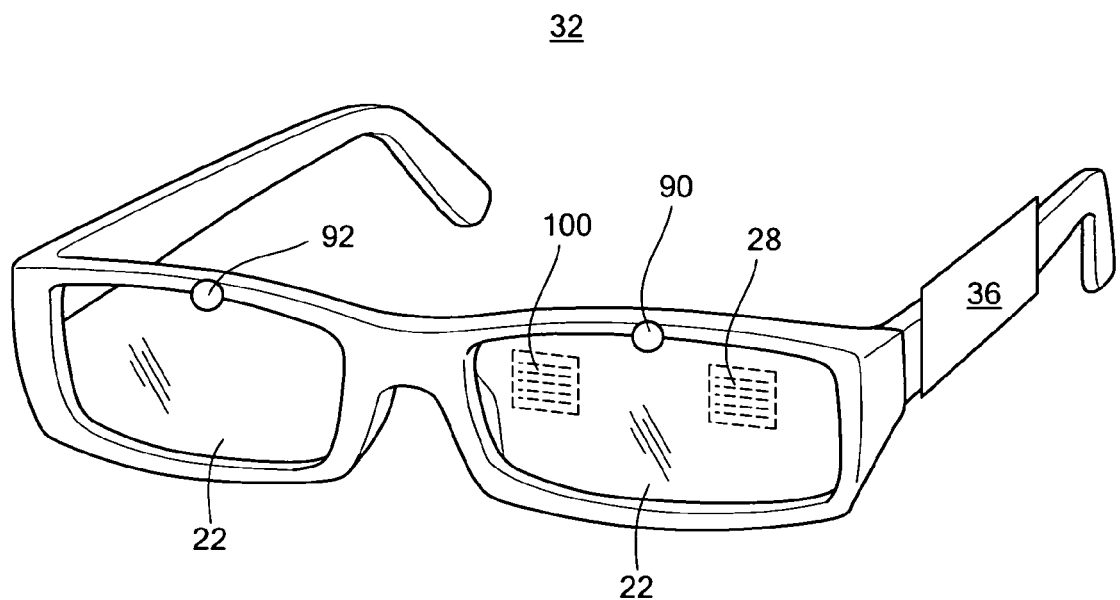
FIG. 6 is a three-dimensional view showing one embodiment of the wearable device shown in one or more of FIGS. 3-5 including one or more cameras.

In another design, system 20', FIGS. 4 and 5, may include wearable device 32 having one or more cameras coupled to transparent display 22, e.g., wearable device 32, FIG. 6, with camera 90 and/or camera 92. Camera 90 and/or camera 92 may sense where on transparent display 22 the operator is looking. Controller/communication module 36 may communicates to controller 62 as discussed above with reference to FIG. 4. Controller 62 may include an algorithm for processing the information from camera 90 and/or camera 92 to correlate it with the information shown on transparent display 22.

Transparent display 22, FIGS. 3-6, may be configured to allow the operator to visually select various data and/or graphical information 28 and/or commands from control area 100 displayed to control operation of the robot 54. Similar as discussed above, controller 62 may include an algorithm to for processing the selected commands from control area 100 to control the operation of robot 54. For safety reasons, each command that may result in motion of the robot 54 may need to require confirmation by the operator.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A system for operation of a robot comprising:
    a substantially transparent display enclosed in a housing having a robot therein and configured such that an operator can see a portion of the robot and data and/or graphical information associated with the operation of a robot; and
    a controller in communication with the robot and the transparent display configured to allow the operator to control the operation of the robot.

2. The system of claim 1 in which the transparent display is located between the robot and the operator.

3. The system of claim 1 in which the substantially transparent display includes a touch screen.

4. The system of claim 2 in which the touch screen is configured with a control area for entering one or more commands to control the operation of the robot.

5. The system of claim 1 in which the controller is configured to display the data and/or graphical information in the transparent display such that the data and/or graphical information appears projected in a distance.

6. The system of claim 1 in which the controller includes an interface having one or more controls configured to allow the user to enter one or more commands to control the operation of the robot.

7. The system of claim 1 further including a hand-held device in communication with the controller configured to allow the user to enter one or more commands to control the operation of the robot.

8. The system of claim 1 further including at least one camera proximate the transparent display configured to detect which portion of the transparent display the operator is looking at.

9. The system of claim 8 further including at least one camera configured to view the operation of the robot.

10. A system for operation of a robot comprising:
    a substantially transparent display enclosed in a housing having a robot therein and located between an operator and a robot; and
    wherein the transparent display is configured such that the operator sees a portion of the robot and data and/or graphical information associated with the operation of a robot.

11. A method for controlling the operation of a robot, the method comprising:
    viewing a portion of a robot through a substantially transparent display enclosed in a housing having a robot therein;
    displaying data and/or graphical information associated with the operation of a robot on the substantially transparent display; and
    controlling the operation of a robot while viewing the data and/or graphical information.

12. The method of claim 11 further including entering one or more commands to control the operation of the robot on the transparent display.

13. The system of claim 1 in which the substantially transparent display is removable from the housing.

14. The system of claim 1 in which the substantially transparent display is configured as a projection shield.

15. The system of claim 1 in which the substantially transparent display is configured to be located in the field of view of the operator.

16. The method of claim 11 in which the substantially transparent display is removable from the housing.

17. The method of claim 11 in which the substantially transparent display is configured as a projection shield.

18. The method of claim 11 further including displaying data and/or graphical information in the transparent display such that the data and/or graphical information appears projected in a distance.

19. The method of claim 11 further including providing a hand-held device in communication with the controller configured to allow the user to enter one or more commands to control the operation of the robot.

20. The method of claim 11 further including providing at least one camera proximate the transparent display configured to detect which portion of the transparent display the operator is looking at.

21. The method of claim 11 further including at least one camera configured to view the operation of the robot.

22. The method of claim 11 further including locating the transparent display in the field of view of the operator.

* * * * *